Figure 1:
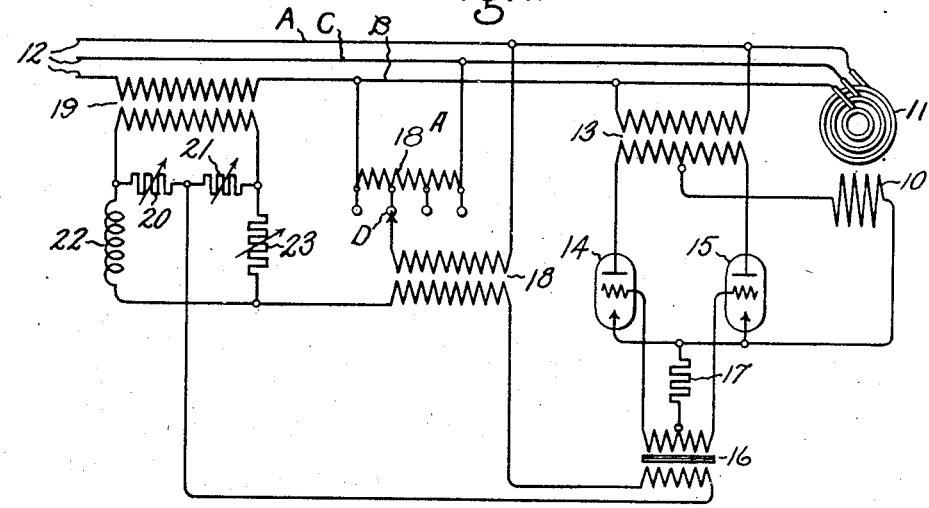

May 10, 1932.  M. ZUCKER  1,857,174

ELECTRIC REGULATING SYSTEM

Filed April 17, 1931

Inventor:
Myron Zucker,
by Chas. E. Mullen
His Attorney.

Patented May 10, 1932

1,857,174

UNITED STATES PATENT OFFICE

MYRON ZUCKER, OF ROYAL OAK, MICHIGAN, ASSIGNOR TO GENERAL ELECTRIC COMPANY, A CORPORATION OF NEW YORK

ELECTRIC REGULATING SYSTEM

Application filed April 17, 1931. Serial No. 530,877.

My invention relates to electric regulating systems and more particularly to such systems suitable for regulating the excitation of synchronous dynamo electric machines.

Heretofore there have been devised various arrangements including electric valves for regulating the voltage or other electrical condition, of a synchronous alternating current generator. Certain of these arrangements of the prior art have not, however, provided all that is to be desired with respect to the stability of the system to which the alternator is connected from the basis of constant voltage with rapid fluctuations in load or power factor.

It is an object of my invention, therefore, to provide an improved regulating circuit for a synchronous dynamo electric machine, including electric valves, by means of which the machine may be operated at its maximum limit of stability irrespective of variations in the load conditions of the machine.

It is another object of my invention to provide an improved regulating system for synchronous dynamo electric machines, including electric valves, in which the regulation is effected not only in accordance with the voltage of the machine but also in accordance with the load current of the machine.

It is a further object of my invention to provide an improved regulating system for a synchronous dynamo electric machine in which the regulation of the excitation of the machine is effected solely in response to variations in the load current of the machine.

It is a still further object of my invention to provide an improved regulating system for a synchronous dynamo electric machine, including electric valves, by means of which the voltage of the machine may be maintained within more narrowly defined limits than has been possible heretofore.

In accordance with one embodiment of my invention the field winding of a synchronous dynamo-electric machine is energized from an alternating current circuit through a pair of electric valves. The grids of the electric valves are excited with an alternating potential the phase of which varies in accordance with variations in the magnitude and phase relation of the load current of the machine. In accordance with certain modifications of my invention, means is provided for amplifying the variations in the voltage of the alternating current circuit of the machine and the phase relation of the grid potentials of the electric valves is controlled in accordance with this amplified voltage variation. In certain cases it may be desirable to combine the two arrangements just described in order to secure a more stable operation of the machine under various types of abnormal operating conditions.

Figure 2:
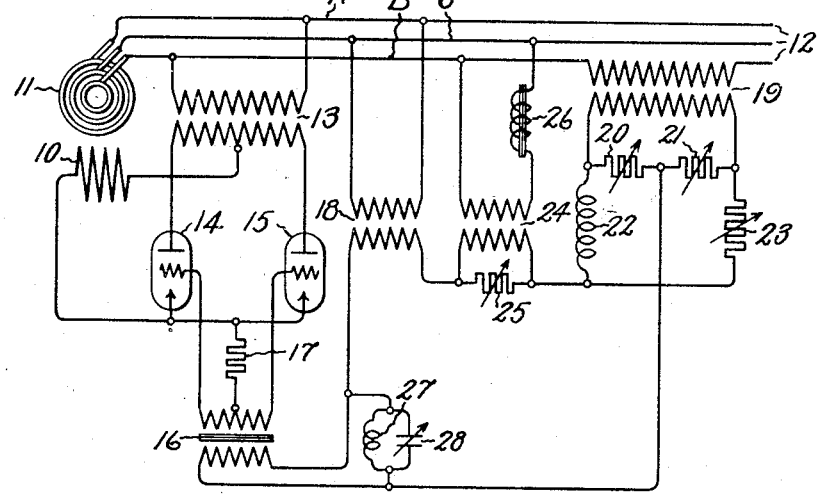
Figure 3:
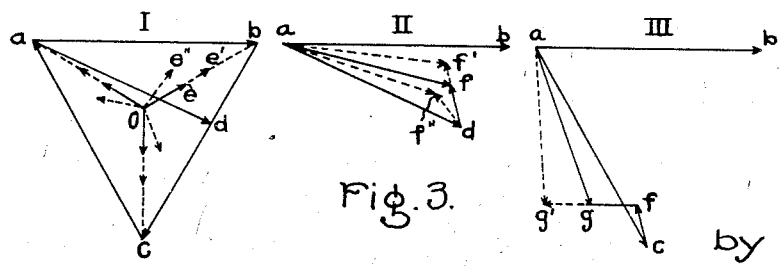

For a better understanding of my invention together with other and further objects thereof, reference is had to the following description taken in connection with the accompanying drawings and its scope will be pointed out in the appended claims. Fig. 1 of the accompanying drawings illustrates my invention as applied to an arrangement for controlling the excitation of a synchronous dynamo-electric machine in response to variations in the load current of the machine; Fig. 2 represents a modification of the apparatus shown in Fig. 1 in which the excitation of the dynamo-electric machine is controlled by the joint effect of the variations in the voltage of the maching and in the load current, and Fig. 3 comprises certain vector diagrams to aid in the understanding of my invention.

Referring more particularly to Fig. 1 of the drawings, I have illustrated an arrangement for controlling the excitation of the field winding 10 of an alternating current generator 11, connected to a three phase alternating current circuit 12, in accordance with the armature current of the machine. This arrangement includes an excitation circuit for the field winding 10 comprising a transformer 13 and a pair of electric valves 14 and 15 connected to form a full wave rectifier with the field winding 10 included in the direct current circuit of the rectifier. As will be,well understood by those skilled in the art, the valves 14 and 15 are each provided with an anode, a cathode and a control grid and may be any of the several types well known in the art, although I prefer to use valves of the vapor electric discharge type. The control grids of the electric valves 14 and 15 are connected to the common cathode circuit through opposite halves of the secondary winding of a grid transformer 16 and a current limiting resistor 17. The primary winding of the grid transformer 16 is energized from a circuit which includes a source of alternating potential which may be adjustably fixed at any desired magnitude and phase relation. This source of potential is shown as derived from an auto-transformer 18A, provided with a plurality of taps and connected between two phases of the alternating current circuit 12, and a transformer 18, the primary winding of which is energized from the third phase of the circuit 12 and one of the taps of the auto-transformer 18A. The primary winding of the grid transformer 16 also includes a source of alternating potential variable in phase and magnitude in accordance with variations in the phase and magnitude respectively of the armature current of the machine 11. This latter source of potential is derived from an impedance phase shifting circuit energized across the secondary winding of a current transformer 19 the primary winding of which is connected in series with one of the phases of the alternating current circuit 12. The phase shifting circuit may comprise any of a number of combinations of resistance, inductance and capacitance, but I have shown by way of example two variable resistors 20 and 21 connected across the secondary winding of transformer 19 and a reactor 22 and variable resistor 23 connected in parallel to the resistors 20 and 21. The desired potential is derived from the midpoints of these two parallel circuits.

The operation of the full wave rectifier energized from the alternating current side of the dynamo-electric machine, the output of which energizes the field winding of the machine and the control of the phase relation of the grid potentials of the electric valves to control the excitation of the machine is so well understood by those skilled in the art that a detailed explanation is not deemed necessary. In brief, as the grid potentials of the valves 14 and 15 are retarded with respect to their anode potentials the valves become conducting at later points in their respective half cycles of positive anode potential and the average voltage of the direct current output of the rectifier is reduced, thus reducing excitation of the machine 11. The manner in which the phase of the grid potentials of the valves 14 and 15 is controlled to secure the desired regulation may be seen more clearly by reference to the Diagrams I and II of Fig. 3. In Diagram I the vectors $ab$, $bc$, and $ca$ represent respectively the voltages between the lines A, B, and C, of the circuit 12 while the vector $ad$ represents the potential between the line A and the tap D of the winding 18A which is impressed upon the transformer 18. In this same diagram the vector $oe$ represents the current flowing in line B. The potential varying in phase and magnitude in accordance with the current $oe$ is derived from the impedance phase shifting circuit. This potential, displaced by a fixed phase angle by means of the phase shifting circuit, is represented by the vector $df$ of Diagram II in which the vector $af$ represents the resultant potential impressed upon the primary winding of the grid transformer 16. For the purposes of explanation it will be assumed that the phase relation between the vector $ab$ which is the potential applied to the anodes of the valves 14 and 15 and the vector $af$ which is applied to the grid of these valves, is such that the proper excitation is maintained on the machine 11 for the optimum conditions of power factor, stability, etc., for the load conditions obtaining on the machine. Obviously, with no load on the machine the vector $af$ becomes the vector $ad$ and this vector may be adjusted by adjusting the connections of the primary winding of the transformer 18 to the auto-transformer 18A in order to give proper no-load excitation. If now the armature current of the machine 11 should increase so that the current in the line B should increase to $oe'$ the vector $df$ will become $df'$ and the grid voltage $af'$ will be advanced in phase with respect to the anode potentials of the valves 14 and 15 to increase the excitation of the machine 11 to compensate for the increase in its load current. On the other hand, in case the armature current of machine 11 departs from unity power factor leading, the vector $oe$ becomes $oe''$ and the vector $af$ the vector $af''$. In this case the vector $af''$ is lagging with respect to the vector $af$, that is, the grid potentials of the valves 14 and 15 are retarded with respect to their anode potentials to decrease the excitation of the machine 11 and thus bring the power factor back to unity. As the no-load excitation of the machine 11 can be determined by properly adjusting the connection to the auto-transformer 18A, so the regulation of the machine 11 can also be determined by properly selecting the ratio of the magnitude of the potential $df$, and the fixed phase angle through which this potential is displaced, with respect to the current vector $oe$. This adjustment can be effected by varying the values of variable resistors 20, 21 and 23. It has been found that these two adjustments make it possible to obtain practically any excitation characteristics of the machine 11 desired.

In Fig. 2 there is illustrated an extension of the system shown in Fig. 1 in which the excitation of the synchronous dynamo-electric machine is regulated in accordance with both the magnitude and power factor of the armature current of the machine and the voltage of the alternating current circuit to which it is connected. In this arrangement the rectifying circuit for energizing the field winding 10 of the machine 11 is identical with that illustrated in Fig. 1, as is the phase shifting circuit for deriving a control potential variable in phase and magnitude in accordance with the phase and magnitude of the armature current of the machine 11. However, the potential fixed in phase and magnitude and derived from transformer 18 is taken directly between the phases A and B, although an auto-transformer might be used as in the arrangement of Fig. 1 if desired. In order to control the grid excitation in accordance with variations in the voltage of the alternating current circuit 12, the primary winding of the grid transformer 16 includes the potential derived from a transformer 24, the primary winding of which is connected across two lines of the alternating current circuit 12 through a self-saturating reactor 26. The effect of the saturating reactor is to greatly magnify the variations in the voltage of the alternating current circuit 12. The secondary winding of the transformer 24 is shunted with a variable impedance device shown as a resistor 25 for securing the proper phase relation between the control potential derived therefrom and the potential of the phase from which the transformer 24 is energized. The control potential so derived is shown by the vector $fg$ of Diagram III in which it is seen that, with an increase in this control potential due to an increase in the voltage of the circuit 12, the grid potential $ag$ becomes retarded to $ag'$, thus reducing the excitation of machine 11 to compensate for the increased voltage and bring it back to normal. It will be apparent that any changes in the armature current of the machine 11 will produce the same regulating effect in conjunction with this voltage control arrangement as that illustrated above in connection with Diagram II. Although it has been found that the use of these two control circuits responsive respectively to the voltage and the current conditions of the machine 11 materially increases the upper limit of stability of the machine 11 and the rapidity of regulation of the machine. it will be obvious to those skilled in the art that either of these control schemes may be used separately if so desired, without departing from my invention.

It has been found that the use of a saturating reactor 26 to amplify the voltage variations of the circuit 12 tends to introduce two sources of error. The first of these is that the wave form of the potential derived from the transformer 24 becomes distorted so that the time at which the resultant of this voltage and that derived from the phase shifting circuit changes polarity from negative to positive, which controls the conductivity of electric valves 14 and 15, becomes somewhat displaced. The second source of error is that the impedance of the saturating reactor 26 is quite sensitive to variations in the frequency of the voltage of the circuit 12, this impedance increasing with an increase in the frequency of the circuit 12. By reference to Diagram III it is seen that an increased impedance of the reactor 26 will shorten the length of the vector $fg$ and thus advance the phase of the grid potential of the valves 14 and 15. However, it has been found that both of these errors may be eliminated by connecting a filter circuit comprising a parallel connected reactor 27 and capacitor 28 across the primary winding of the grid transformer 16. Either or both of the reactor 27 and capacitor 28 may be made variable in order to secure the proper calibration. The action of the filter circuit in eliminating the distortion of the sine wave produced by the saturating reactor 26 will be well understood by those skilled in the art. It will also be apparent to those skilled in the art that the capacitive reactance of this parallel filter circuit will increase with an increase in frequency. The energizing circuit of the grid transformer 16 may be considered as the equivalent of a circuit including a variable reactance and resistance in series with a source of alternating potentials; the variable reactor comprising mainly the reactor 27 and capacitor 28. As the frequency increases and the reactance of the parallel circuit increases capacitively, the potential across this circuit which is applied to the primary winding of grid transformer 16 will be retarded in phase. By proper adjustment of the circuit constants, this retarding in phase due to the filter circuit may be made equal and opposite to the advancing in phase of the grid potential $ag$ of Diagram III due to the increase in the impedance of the saturable reactor 26. Obviously with a decrease in the frequency of the circuit 12, the reverse corrective action will take place.

While the apparatus described above in connection with Figs. 1 and 2 is of general application to synchronous dynamo-electric machines, it has been found that the apparatus illustrated in Fig. 1 is particularly suitable to the control of the power factor of a synchronous motor, whilst that illustrated in Fig. 2 is particularly suitable for the control of the voltage of a synchronous alternating current generator.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a synchronous dynamo-electric machine provided with armature and field windings, an alternating current circuit connected to said armature winding, means for energizing said field winding from said circuit including an electric valve provided with an anode, a cathode and a control grid, and means responsive to the armature current of said machine for controlling the phase relation between the potentials of said grid and anode.

2. In combination, a synchronous dynamo-electric machine provided with armature and field windings, an alternating current circuit connected to said armature winding, means for energizing said field winding from said circuit including an electric valve, and means responsive to the power factor of the armature current of said machine for controlling the conductivity of said valve.

3. In combination, a synchronous dynamo-electric machine provided with armature and field windings, an alternating current circuit connected to said armature winding, means for energizing said field winding from said circuit including an electric valve, and means for controlling the conductivity of said valve in accordance with the phase and magnitude of said armature current.

4. In combination, a synchronous dynamo-electric machine provided with armature and field windings, an alternating current circuit connected to said armature winding, means for energizing said field winding from said circuit including an electric valve provided with an anode, a cathode, and a control grid, and means for controlling the phase relation of the potentials of said grid and anode in accordance with the phase and magnitude of said armature current.

5. In combination, a synchronous dynamo-electric machine provided with armature and field windings, an alternating current circuit connected to said armature winding, means for energizing said field winding from said circuit including an electric valve provided with an anode, a cathode, and a control grid, a grid circuit for said valve including a source of potential proportional to that of said alternating current circuit and a source of potential, the phase and magnitude of which vary in accordance with variations in the phase and magnitude of the armature current of said machine, and means for producing an adjustably fixed phase displacement in said potentials, so that the phase of their resultant varies in accordance with variations in either phase or magnitude of said armature currents.

6. In combination, a synchronous dynamo-electric machine provided with armature and field windings, an alternating current circuit connected to said armature winding, a circuit for energizing said field winding from said circuit including an electric valve provided with an anode, a cathode, and a control grid, a circuit for deriving from said alternating current circuit, a potential adjustably fixed in phase, a series transformer connected in said armature circuit, an impedance phase shifting circuit energized therefrom, and a grid circuit for said valve including said derived potential and a potential taken from said phase shifting circuit.

7. In combination, a synchronous dynamo-electric machine provided with field and armature windings, an alternating current circuit connected to said armature winding, a circuit for energizing said field winding from said circuit including an electric valve provided with a control grid, a grid circuit including a source of potential substantially constant in phase and magnitude and a second source of potential variable in accordance with variations in the potential of said armature circuit but at an amplified rate, and means for producing an adjustably fixed phase displacement in the potential from said second source so that the resultant of the two potentials varies in phase in accordance with variations in magnitude of said second potential.

8. In combination, a synchronous dynamo-electric machine provided with field and armature windings, an alternating current circuit connected to said armature winding, a circuit for energizing said field winding from said circuit including an electric valve provided with a control grid, a circuit including a self-saturating reactor, and an impedance element connected across said alternating current circuit, and a grid circuit for said valve including a potential derived from said alternating current circuit and the potential across said impedance element.

9. In combination, a synchronous dynamo-electric machine provided with field and armature windings, an alternating current circuit connected to said armature winding, means for energizing said field winding from said circuit including an electric valve provided with a control grid, means for producing a potential variable in accordance with that of said armature circuit but at an amplified rate, said potential being variable also in accordance with variations in the frequency of said alternating current circuit, a grid circuit for said valve including a source of potential substantially constant in phase and magnitude and said variable potential, and means associated with said grid circuit for compensating for the variations of said first potential due to variations in the frequency of said armature current.

10. In combination, a synchronous dynamo-electric machine provided with field and armature windings, an alternating current circuit connected to said armature winding, a circuit for energizing said field winding from said circuit including an electric valve provided with a control grid, a circuit including a self-saturating reactor and a resistance connected across said alternating current circuit, a grid circuit for said valve including a potential derived from said alternating current circuit and the potential across said resistor, and a resonant circuit connected across said grid circuit.

11. In combination, a synchronous dynamo-electric machine provided with field and armature windings, an alternating current circuit connected to said armature winding, means for energizing said field winding from said circuit including an electric valve provided with a control grid, and a grid circuit including means responsive to the armature current of said machine, and means responsive to the potential of said alternating current circuit.

12. In combination, a synchronous dynamo-electric machine provided with field and armature windings, an alternating current circuit connected to said armature winding, means for energizing said field winding from said circuit including an electric valve provided with a control grid, a grid circuit including a source of potential substantially constant in phase and magnitude, a second source of potential variable in accordance with variations in the potential of said armature circuit but at an amplified rate, and in accordance with variations in the frequency of said armature current, and a source of potential variable in phase and magnitude in accordance with variations in the phase and magnitude of said armature current, and means associated with said grid circuit for compensating for variations in said grid potential due to variations in the frequency of said armature current.

In witness whereof I have hereunto set my hand.

MYRON ZUCKER